No. 650,081. Patented May 22, 1900.
W. P. MURPHY.
FENDER FOR ORCHARD CULTIVATORS.
(Application filed May 17, 1899.)
(No Model.)
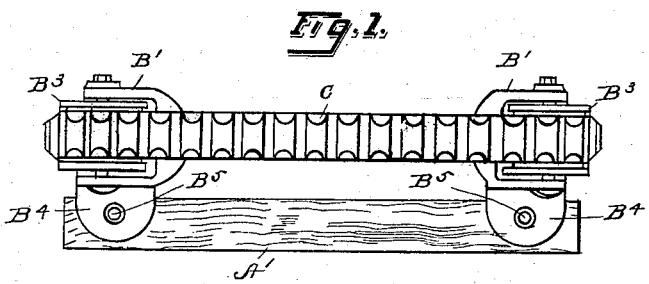
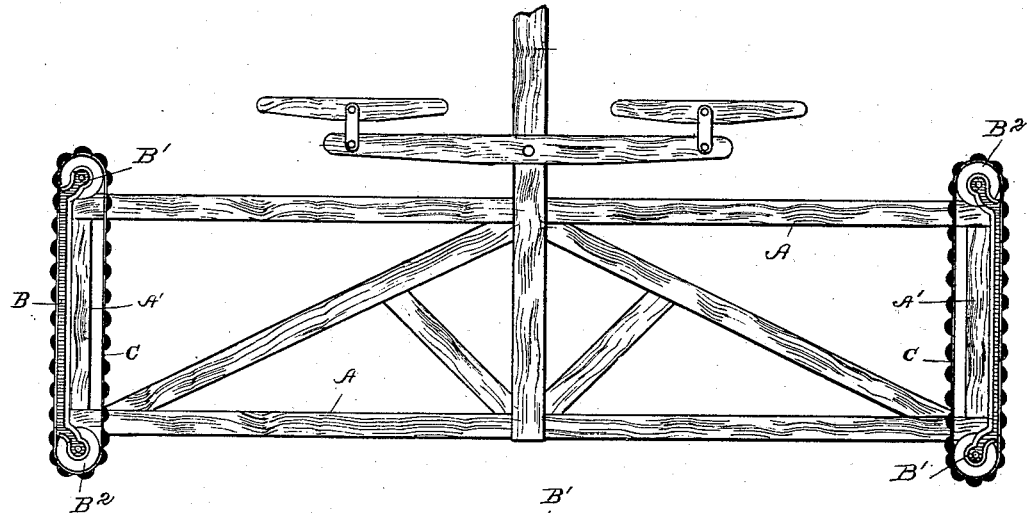
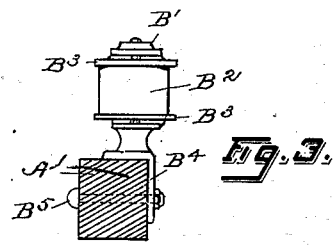
WITNESSES:
INVENTOR.
William P. Murphy
BY
C. F. Murdock & Co.
ATTORNEYS

UNITED STATES PATENT OFFICE.

WILLIAM P. MURPHY, OF SAN JOSÉ, CALIFORNIA.

FENDER FOR ORCHARD-CULTIVATORS.

SPECIFICATION forming part of Letters Patent No. 650,081, dated May 22, 1900.

Application filed May 17, 1899. Serial No. 717,211. (No model.)

*To all whom it may concern:*

Be it known that I, WILLIAM P. MURPHY, a citizen of the United States, residing at San José, in the county of Santa Clara and State of California, have invented certain new and useful Improvements in Fenders for Orchard-Cultivators; and I do hereby declare the following to be a full, clear, and exact description of said invention, such as will enable others skilled in the art to which it most nearly appertains to make, use, and practice the same.

This invention relates to improvements in cultivators, and more particularly to orchard-cultivators.

In the drawings, Figure 1 is an enlarged detail view in elevation of the invention as applied to the side beam of a cultivator. Fig. 2 is a plan view of a fender as applied to a cultivator of the type preferred for orchard-work. Fig. 3 is an end elevation showing the invention in its preferred form.

The object which the present invention has in view is to provide a fender which will prevent the side of the cultivator structure coming in contact with the plants of the orchard to remove the bark therefrom or bruise the plants.

With this object in view the invention consists in the construction and arrangement of the parts herein shown and described whereby a continuous belt or surface is suitably mounted upon the side or sides of the cultivator-frame in such manner that when the belt or surface is brought in contact with the plants that portion in contact with the plants will remain stationary, the belt moving about the antifriction devices, with the effect that the cultivator is pushed to one side until it clears the plant without abrasion of the bark of the plant.

It further consists in the construction and arrangement of the fender and parts thereof so that the same may be produced as an attachment to cultivators as at present constructed.

To facilitate the description of the present invention with reference to the drawings, we will use the letter A to designate the frame of the cultivator, which in the construction shown in the drawings is provided with two parallel beams extending transversely to the line of draft of the implement and provided with the short side beams $A'$ $A'$.

The frame of the cultivator may be constructed in any desired manner, that shown in the drawings being intended to represent one of the preferred forms of frames of a cultivator at present used in orchards. It is upon the side beams $A'$ that the fenders are placed.

As shown in the drawings, the fender is constructed to be used as an attachment to an existing frame. In this form of the invention it consists in the arm B, which is bent to form the journals $B'$ $B'$, which are set back, as shown in Fig. 2 of the drawings, to receive the rollers $B^2$. These rollers are provided with the flanges $B^3$, between which operates the belt C, which is continuous in form and extends over both rollers $B^2$ $B^2$, as shown in the drawings, particularly at Fig. 2. The arm B is so constructed that the main portion extending between the rollers rests lightly against the back of the belt C when in its flexed condition and forms a sliding surface for the belt when the same is operating as a fender. Below the journals $B'$ are formed the attaching-lugs $B^4$ $B^4$ at either end of the arm B.

In the present illustrations the invention is shown as constructed to be applied to a wooden construction which will permit the introduction of the bolts $B^5$ as the fastening devices for securing the lugs $B^4$ and the arm B to the cultivator-frame. It will be understood, however, that this construction may be variously changed to suit the purpose of applying the invention to various forms of metal constructions. The length of the arm B is by preference sufficient to extend the rollers or drums $B^2$ beyond the ends of the side beams $A'$ of the cultivator-frame. This may be altered without avoiding the spirit of the invention, as would be illustrated more particularly in the use of the invention upon the extending ends of cultivator-frames of what is known as the "V-shape" construction. In such a construction there might exist no necessity for protecting the entire side beam of the cultivator-frame. Also there has been herein described the preferred construction embodying the present invention, whereby it is constructed as a separable attachment which may be applied to a cultivator-frame. It is evident, however, that the invention may be applied directly to the side beam of the cultivator-frame, using the side beam of the cultivator-frame as a substitute for the arm B shown in the drawings. In wooden constructions this might be accomplished by extending the rollers $B^2$ beyond the ends of the beam and on a level therewith, or the construction might be changed by slotting the ends of the side beams to receive and form bearings for the rollers $B^2$. All these constructions would be within the intent of the present invention in so far as they would constitute a frame for supporting the rollers $B^2$, upon which would be mounted the belt or fender C.

The fender C, as before stated, is mounted about the rollers $B^2 B^2$. In its preferred form it is made of two materials. The outer material is preferably corrugated rubber to produce a friction-surface which will not slide when brought in contact with the bark of the plant. The inner surface may be formed of leather, metal belting, or canvas, all of which will readily slide upon the arm B, against which the inner surface of the belt rests during the operation of the invention as a fender.

When constructed as described and applied to the side beams of the cultivator-frame, the operation of the invention is as follows: The greatest liability to the barking of trees exists at the time when in cultivating an orchard having arrived at the end of a row of trees and when making the turn about the same the cultivator is apt to be thrown against the tree about which it is being turned. When this happens with cultivators not provided with this invention, it is evident that the bark of the tree is bruised or abraded. With cultivators provided with this invention, however, the contact of the tree is received upon the belt C, the friction-surface thereof adhering to the bark, while the frictionless inner surface of the same slides upon the arm B of the fender. This produces the effect of shoving the cultivator to one side while the same is drawn around and past the tree without bruising or abraiding the bark of the tree.

While the invention has been described as being adapted to and forming a part of cultivators, it will be understood that it may be attached to and form a part of most agricultural implements which may be used in orchard cultivation, and it is applied to the part of the structure thereof which is liable to be drawn against the sides of the trees or plants.

Having thus described this invention, what is claimed is—

1. The combination with a cultivator or the like, of a continuous belt supported upon said cultivator and having a portion extending upon the outer side of the implement, whereby when said extending portion of the belt is engaged by another object it is adapted to move; substantially as described.

2. The combination with a cultivator or the like, of members rotatably supported thereon, and a continuous belt supported upon and between said rotatable members and extending upon the outer side of the implement; substantially as described.

3. In a fender for cultivators and like implements, a frame adapted to be attached to the structure of the implement; rotatable members mounted in the ends of the said frame; a continuous belt supported upon and extending between the said rotatable members; and suitable fastening devices, by means of which the said frame is attached to the structure of the implement, substantially as described.

4. In a fender for cultivators and like implements, in combination with a frame provided with journals in the ends thereof to receive rollers; rollers journaled therein; a continuous belt supported upon and extending between the said rollers; and fastening devices for securing the said frame to the structure of the implement to which it is applied, the said belt extending beyond the outer surface of the structure, substantially as described.

5. In a fender for cultivators and like implements, in combination with a frame adapted to be secured to the structure of the implement and to extend beyond the surface thereof and having in the ends thereof journals to receive rollers; rollers mounted in the said journals; and a continuous belt supported upon and extending between the said rollers and extending beyond the outer surface of the structure of the implement, said belt being provided on the outer surface with a friction-surface to engage the objects with which it comes in contact, substantially as described.

In testimony whereof I have hereunto set my hand this 19th day of April, 1899.

WILLIAM P. MURPHY.

Witnesses:
W. C. KENNEDY,
HIRAM A. BLANCHARD.